(No Model.)
J. H. LEIGHTON.
MANUFACTURE OF SOLID GLASS SPHERES.
No. 462,083. Patented Oct. 27, 1891.
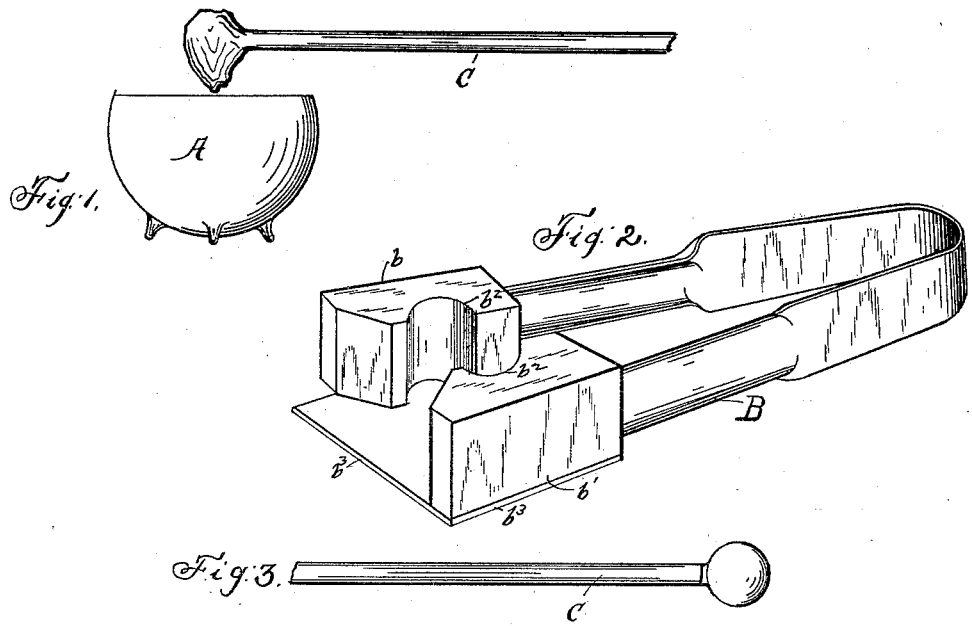
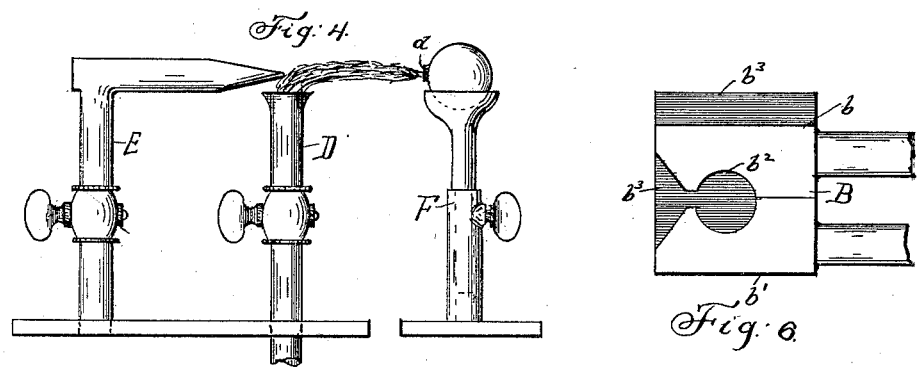
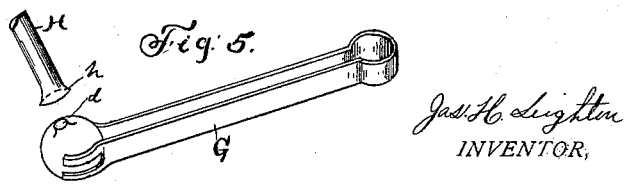
WITNESSES:
Victor Schneider,
Alfred Symes.
Jas. H. Leighton
INVENTOR,
BY H. T. Fisher
ATTORNEY.

UNITED STATES PATENT OFFICE.

JAMES HARVEY LEIGHTON, OF AKRON, OHIO, ASSIGNOR OF ONE-HALF TO MAY HAYS MILLER, OF SAME PLACE.

MANUFACTURE OF SOLID GLASS SPHERES.

SPECIFICATION forming part of Letters Patent No. 462,083, dated October 27, 1891.

Application filed March 28, 1891. Serial No. 386,773. (No model.)

*To all whom it may concern:*

Be it known that I, JAMES HARVEY LEIGHTON, a citizen of the United States, residing at Akron, in the county of Summit and State of Ohio, have invented certain new and useful Improvements in the Manufacture of Glass Spheres or Balls; and I do hereby declare that the following is a full, clear, and exact description of the invention, which will enable others skilled in the art to which it appertains to make and use the same.

My invention has reference to the manufacture of glass spheres or balls—such, for example, as playing-marbles; and the invention comprises both the process by which the spheres are formed and the means or apparatus for forming the same. The process necessarily involves several successive and related steps, and the accompanying drawings serve to illustrate such steps and the means for carrying the same into effect.

Figure 1 represents a melting-pot, above which is a rod having some of the material adhering to its extremity. Fig. 2 is an enlarged view of the former, hereinafter more fully described, and in which the material is worked into spherical shape. Fig. 3 shows the afore-mentioned rod with the material on as it comes from the former. Fig. 4 shows means for holding the ball after it is separated from its handle and directing a flame against the stub or projection thereon, which occurs where the handle-stem is severed from the ball. This projection is shown here as larger than it ordinarily is in practice with a view to more clearly illustrating the invention. Fig. 5 shows the ball held by tongs after the above-mentioned heating has occurred and an instrument for rounding off and smoothing the ball at this point, as hereinafter more fully described. Fig. 6 is a plan view of the front end of the former when closed.

The process by which the sphere or marble is produced for sale and use and as herein illustrated requires, first, a melting-pot or crucible A, of any suitable form or kind, in which the material is melted to the proper consistency for use—such a pot or crucible, for example, as is shown in Fig. 1. Having the material provided in this way in suitable kind and condition, the next step is to take out of the crucible just as much of the material as is required to produce the size of sphere proposed to be made. This may be done in any one of several way that might be suggested; but the simplest and best way is to employ an iron or steel or other like rod of suitable size and length. This is dipped into the material, and sufficient of the material will adhere to the point thereof on one or more dippings in succession, according as more or less material is wanted and a practiced eye will determine, to form the size of marble previously determined on. Having thus withdrawn on the point of the rod the material wanted to make a single marble, it is kept on the rod and turned round and round over a suitable smooth surface to work it into something like cylindrical shape or into such shape as to adapt it to be placed in the former B. (Shown in Fig. 2.) This former consists of two parts $b$ and $b'$, connected by a spring-shank and having at the front on its opposite faces the semi-cylindrical grooves or channels $b^2$, extending entirely across the faces of said parts, which in working size are in the neighborhood of two inches deep. The opposed grooves $b^2$ of the former, when the sections are brought closely together, constitute a perfectly-circular open space in cross-section, except the narrow opening along the front, through which the stem of the material undergoing operating is supported by the rod. A small plate $b^3$ is fixed on one of the sections at its front and bottom to prevent the material from working down out of the former during the shaping of the same therein, and the other section is free to play back and forth over the surface of said plate.

When the material has undergone the initial shaping above described on the end of the rod, it is inserted between the grooved ends of the former, and is gradually worked into spherical outline by rotating it axially at the same time that the grooved sections are pressed more and more closely together. This turning is done by one hand by means of the rod C, which still serves as the handle for the material, while the former is held in the other hand and its sides are brought gradually to a closed position as the material takes shape, until at last they are closed all together, when the shaping, so far as the former is concerned, is completed. It will be understood that during this step in the work the material continues in a plastic or pliable condition, so that molding is possible. The stage of the work at the end of this step is illustrated in Fig. 3, which shows the nearly-finished sphere still on its handle. During the operation of thus forming the sphere the material is rolled over and over in the former by turning the handle axially. This will make a perfectly round and solid ball with a smooth surface everywhere except at the handle-stem, and when this occurs the ball or sphere is ready for the next step in the manufacture. It may be said here, however, that the preceding step is not necessarily limited to the shape and style of former here shown, although this is an exceedingly simple and satisfactory one to use. Any kind or style of mold or device which will give spherical outline as this one does may be used. The sphere, being taken from the former, is next severed from its handle in any suitable way. This severing or cutting occurs quite close up to the side of the sphere, so as to have very little surplus material thereon to dispose of. Yet a little material and consequent unevenness at this point will remain, and it next becomes necessary to relieve this imperfection and bring the mass to a perfectly spherical and finished condition. This is accomplished by first subjecting the slightly raised and imperfect part $d$ to a jet of heat of such intensity as will soften or melt the material at this point sufficiently to press it down and smooth it over until it assumes the appearance of the remainder of the surface and is rounded off with the remainder. For this purpose I show here a common arrangement of gas-jet D and an air-blast E, with a standard F, having a concave seat to accommodate the sphere. The imperfection $d$ is here exposed to the jet of heat, which is concentrated thereon, and when the softening process has gone far enough, which one a little practiced will readily perceive, the sphere is lifted off with a pair of tongs G, Fig. 5, and an instrument H, with a concave head $h$, is applied to the imperfection and twirled with a little accompanying pressure until it totally disappears and the task is finished.

It will be understood that the material does not cool off from the time it leaves the melting-pot until the marble is finished. If it were not hot when subjected to the jet of heat, as in Fig. 4, it would instantly fly into pieces by reason of the uneven expansion that would occur.

Any sufficient method of heating the ball or sphere to smooth down the slight remaining projection $d$ in lieu of that shown in Fig. 4 may be employed.

Rocking or rolling the ball over its projection $d$ when the same has been softened sufficiently may serve the same purpose fairly well, especially if this be done under more or less pressure and in a suitable groove or channel.

Two parallel grooved and suitably-constructed pieces arranged to reciprocate in respect to each other, or one on the other and under suitable pressure may be employed instead of the former shown in Fig. 2; but the former is preferred for this purpose, both on account of its convenience without the use of artificial power and of the quality of the work. It will also be understood that the invention covers working in glass or any other form of vitrious substance or like material capable of being molded into form, as herein described.

The method herein described of reducing or evening down a projection on the surface of glass, as the projection $d$ in this instance, by first heating the projection to a molten state by means of a jet of flame or its equivalent and then making this part of the surface conform to that about it need not necessarily be limited to glass spheres, but may be generally employed in the art where similar work is desirable.

Having thus described my invention, what I claim as new, and desire to secure by Letters Patent, is—

1. The process herein described of forming spheres, the same consisting in holding and turning a small quantity of the material in a former adapted to open and close on the material and thus rounding the same, then separating the support of the material from the sphere so formed, and finally subjecting the uneven surface produced by separating the support to a jet of heat and rounding off this heated point or surface thus exposed to the jet, substantially as described.

2. The former herein described, consisting of opposed heads having each a semi-cylindrical groove across its face and handles with a spring to force the heads apart, in combination with a fixed plate on one side of said heads, substantially as described.

3. The former having heads with cylindrical grooves, a plate fixed to one head and overlapping the groove in the other head, said heads constructed on their meeting faces to close against each other behind said grooves and to leave an open space in front of the grooves, substantially as described.

Witness my hand to the foregoing specification this 17th day of February, 1891.

JAMES HARVEY LEIGHTON.

Witnesses:
S. S. MILLER,
J. M. ROWLEY.